(12) United States Patent
Stampe

(10) Patent No.: US 6,453,850 B1
(45) Date of Patent: *Sep. 24, 2002

(54) ELECTRICAL APPARATUS FOR DISCOURAGING ANIMALS FROM LICKING

(76) Inventor: David A. Stampe, 13867 Garrett Ave., Apple Valley, MN (US) 55124

( * ) Notice: Subject to any disclaimer, the term of this patent is extended or adjusted under 35 U.S.C. 154(b) by 0 days.

This patent is subject to a terminal disclaimer.

(21) Appl. No.: 09/743,680

(22) PCT Filed: Dec. 18, 1998

(86) PCT No.: PCT/US98/27114
§ 371 (c)(1),
(2), (4) Date: Jun. 19, 2000

(87) PCT Pub. No.: WO99/31972
PCT Pub. Date: Jul. 1, 1999

Related U.S. Application Data

(63) Continuation-in-part of application No. 08/994,082, filed on Dec. 19, 1997, now Pat. No. 5,896,830.
(60) Provisional application No. 60/090,651, filed on Jun. 25, 1998.

(51) Int. Cl.[7] .............................................. A01K 29/00
(52) U.S. Cl. ...................................................... 119/712
(58) Field of Search ................................ 119/822, 820; 128/878, 879, 880, 881, 882

(56) References Cited

U.S. PATENT DOCUMENTS

| 2,177,789 A | 10/1939 | Sacker |
| 2,998,008 A | 8/1961 | Klesa |
| 3,042,036 A | 7/1962 | Abadjieff |
| 3,942,306 A | 3/1976 | Kulka |
| 4,036,179 A | 7/1977 | Turner et al. |
| 4,153,009 A | 5/1979 | Boyle |
| 4,476,814 A | 10/1984 | Miller |
| 4,665,907 A | * 5/1987 | Leverette |
| 5,469,814 A | 11/1995 | Moy et al. |
| 5,896,830 A | * 4/1999 | Stampe |
| D417,529 S | 12/1999 | Stampe |

FOREIGN PATENT DOCUMENTS

WO   PCT/US98/27114   7/1999

* cited by examiner

Primary Examiner—Thomas Price
(74) Attorney, Agent, or Firm—Skinner and Associates

(57) ABSTRACT

The present invention provides an apparatus (10) and method for deterring an animal from licking, e.g., a wound. In one preferred version, the apparatus (10) includes a laminate body having an inner surface and a outer surface comprising an elongated flexible substrate (50) folded upon itself to define a pocket receptacle. The outer surface has exposed conductive traces (51, 52) positioned therealong. An electrical power source (12), retained within the pocket receptacle in the folded substrate, is electrically coupled to the conductive traces (14, 15). An adhesive (27) is carried by at least a portion of the inner surface of the laminate to facilitate attachment of the substrate to the body of an animal with the conductive traces (14, 15) exposed so that when the conductive traces (14, 15) contact the animal's tongue, the tongue completes an electrical circuit and an electrical impulse is delivered through the tongue.

16 Claims, 4 Drawing Sheets

ELECTRICAL APPARATUS FOR DISCOURAGING ANIMALS FROM LICKING

This application is a 371 of PCT/US 98/27114 filed Dec. 18, 1998 which claims benefit of Prov. No. 60/090651 filed Jun. 25,1998, which is a C-I-P of Ser. No. 08/994,082 filed Dec. 19, 1997 U.S. Pat. No. 5,896,830.

BACKGROUND OF THE INVENTION

The present invention relates generally to an electrically actuated apparatus for discouraging animals from licking their wounds, and more particularly to an apparatus which is provided with a self-contained power source and has exposed conductive traces for completing a circuit through the animal's tongue whenever it comes in contact with adjacent conductive traces. The apparatus has been found to be particularly useful for use when pets such as dogs or cats suffer wounds and their tendency to lick their wounds impairs prompt healing. The apparatus is further adapted for use with larger domestic animals who frequently suffer wounds and also develop certain "hot spots" during continued exposure to certain skin aggravating conditions.

In the past, various devices have been proposed and/or employed for use in discouraging animals from this practice. These devices, for the most part, have been cumbersome and difficult to controllably position on the skin adjacent the wound. Furthermore, due to their large size, most prior art devices are susceptible to being removed by the animal through rubbing contact with stationary objects.

SUMMARY OF THE INVENTION

In accordance with the present invention, however, an electrical animal deterrent has been designed to discourage animals from licking their wounds. The deterrent is desirably a self-contained, relatively flat device containing a battery power source in captured disposition therewithin. One embodiment of the present invention comprises an elongated, flexible substrate which is foldable upon itself to form a composite laminate, with the laminate having at least a pair of conductive traces positioned in spaced-apart relationship along a major surface of the laminate configuration.

The battery power source of this embodiment is coupled and in circuit with the exposed conductive traces, and is captured between folded-over segments of the substrate which form the laminate configuration. In one embodiment, a conductive adhesive couples the traces to the battery power source and completes the circuit path. In addition, a layer of pressure sensitive adhesive may be provided on the second major surface of the laminate configuration to hold and/or bond the apparatus to the body of the animal in a location adjacent the site of the wound. In this arrangement, the conductive traces are disposed so that upon contact with the animal's tongue, an electrical circuit is completed through the tongue, delivering an electrical impulse through the sensitive tissues of the animal.

This embodiment of the invention provides an improved electrically actuated apparatus for discouraging and dissuading animals from licking their wounds, with the apparatus comprising adjacently positioned conductive traces which permit an electrical circuit to be completed through the sensitive tissues of the animal.

This configuration also employs an elongated flexible substrate, foldable upon itself to form a receiving station for a battery power source. Electrically conductive traces are positioned adjacent one another to deliver an electrical charge to the sensitive tongue tissue of the animal when the tongue touches adjacent traces.

This can be carried out using a laminate body having a first major surface with conductive traces positioned thereon for delivering an electrical impulse to the animal upon contact with the animal's tongue, and a second major surface with a layer of pressure sensitive adhesive for attaching the apparatus to the body of the animal in a location adjacent the site of the wound.

DETAILED DESCRIPTION OF THE PREFERRED EMBODIMENTS

Figure 5:
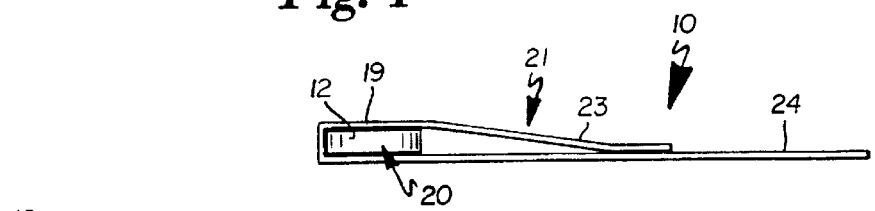
FIG. 5 is a side elevational view following placement of the battery power source and insertion within the pocket receptacle formed in the elongated flexible substrate upon folding.

In accordance with one preferred embodiment of the present invention, the electrically actuated animal deterrent apparatus is shown generally at 10, with the apparatus including an elongated flexible substrate 11 which is foldable upon itself to form a composite laminate configuration as illustrated in FIG. 5. The deterrent apparatus 10 further includes a power source 12 (e.g., one or more batteries) which is coupled in circuit with conductive traces provided on surfaces of the substrate as set forth hereinafter.

Figure 1:
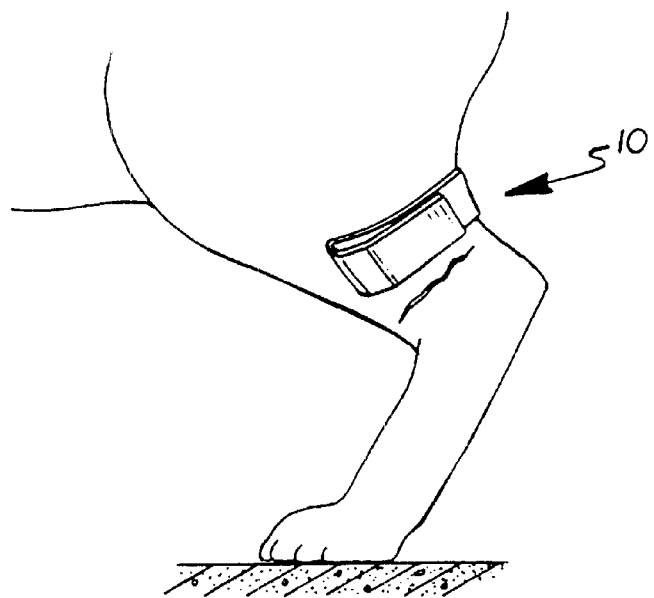
FIG. 1 is a partial side view of the body of a pet, typified as a hind leg of a dog, having an animal deterrent apparatus of the present invention adhesively secured to the leg in a location adjacent the site of a wound.

Accordingly, and with reference to FIG. 1 of the drawings, conductive traces are provided as indicated at 14 and 15, with adjacent traces being coupled to opposite poles of the battery power source 12. Additionally, a complementary/cooperating set of traces is provided at 16 and 17 to provide additional areas for exposure to the tongue of the animal.

Figure 6:
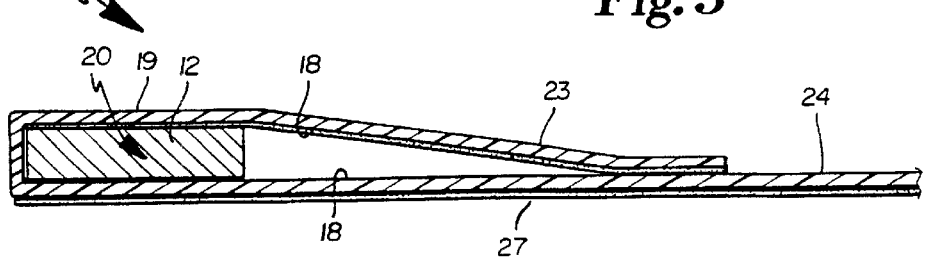
FIG. 6 is an enlarged view of FIG. 5 taken along the line and in the direction of the arrows 6—6 of FIG. 2, and illustrating the detail of coatings applied to various surface portions of the elongated flexible substrate.

In order to provide for electrical continuity between the opposite poles of the battery power source, conductive adhesive pads are provided at 18 and 19 in order to capture and retain the battery power source in position within the pocket zone 20 formed upon foldover of the elongated flexible substrate means 11. Thus, as indicated, the elongated flexible substrate means is folded over upon itself to form a composite laminate configuration as seen in FIGS. 5 and 6, and with parallelly disposed conductive trace means being positioned in spaced relationship along a first resulting surface of the laminate, as shown generally at 21. Also as indicated above, the power source 12 is in circuit with the conductive traces and is captured in the pocket formed between the folded-over segments of the substrate, thus fixing the power source within the folded-over laminate configuration. In order to provide for electrical contact to the battery surface, pad 19 may be cut at its perimeter in a semicircular fashion as illustrated at 19A, and thereafter folded over as indicated at 19B to provide a pad for electrical contact to the remaining portions of the conductive traces 14. Pads or coatings of conductive adhesive such as illustrated at 18 and 19 are used to secure the battery in place and to retain the elongated flexible substrate in its folded-over configuration to create the electrically actuated apparatus 10.

Figure 2:
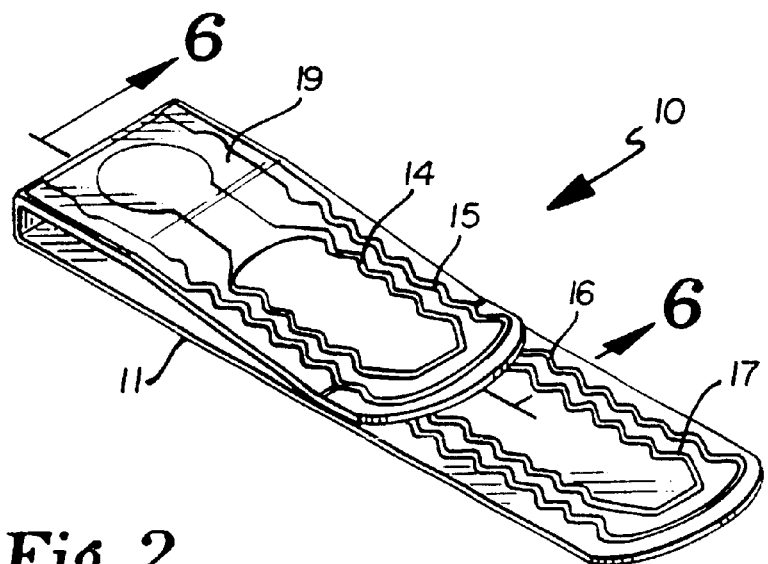
FIG. 2 is a perspective view of the electrically actuated apparatus showing a first major surface of the device with exposed traces arranged in parallel relationship thereon.
Figure 3:
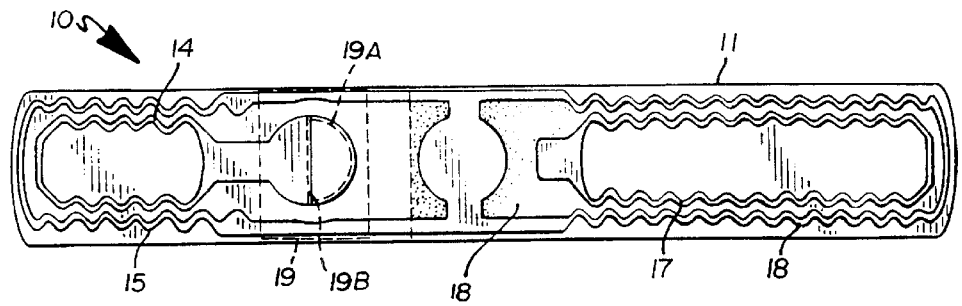
FIG. 3 is a top plan view of an elongated flexible substrate means which is foldable upon itself to form a composite laminate configuration including a pocket receptacle for a battery power source, with FIG. 3 illustrating the configuration prior to the fold-over operation.
Figure 4:
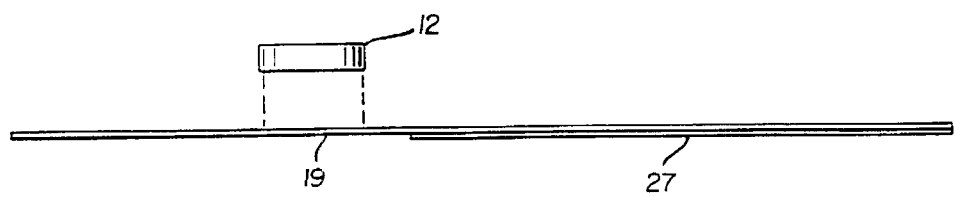
FIG. 4 is an exploded elevational view showing the elongated flexible substrate with a battery power source in exploded disposition therefrom.

In order to provide for the conductive traces and line definition thereof, the traces 14 and 15 may be formed in the configuration illustrated in FIG. 2. Alternatively, they may be laid down as wider strips and the exposed surface of these wider strips may be delineated by means of appropriate covering or laminating with coverlay film. Such coverlay film can make it easier to print the conductive traces yet appropriately delineate the conductive traces to the desired shape and surface area.

With attention being directed to FIG. 6 of the drawings, the adhesive pads or layers are identified by reference numerals 18 and 19 and 19C. In addition, pressure sensitive adhesive layer is provided at 27 in order to attach or otherwise secure the apparatus to the surface of the skin of the effected animal, with this mounted configuration being illustrated in FIG. 1 of the drawings. There is no adhesive present on the outer surface of the exposed substrate segments identified as 23 and 24 in FIG. 6. It will be appreciated that segments 23 and 24 are, of course, formed from the folded-over configuration of the substrate and accordingly form portions of the first major surface, this being the surface upon which the conductive traces are exposed.

Figure 7:
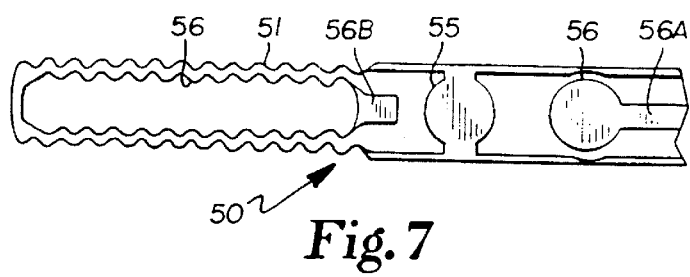
FIG. 7 is a top plan view of an alternate preferred embodiment of the present invention, with the 5 substrate in its flat and unfolded configuration.
Figure 8:
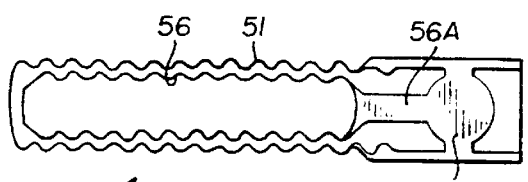
FIG. 8 is a top plan view of the substrate of FIG. 7 in folded disposition.

FIGS. 7 and 8 schematically illustrate another preferred embodiment of the invention. In FIG. 7, the substrate 50 is provided with conductive traces 51 and 52, and is further provided with conductive pads 55 and 56 for contact with the battery or power cell. Preferably, pads 55 and 56 are formed of conductive, pressure sensitive adhesive for transferring electrical energy from the cell to the individual conductive trace means.

Upon folding-over of the substrate 50, the power cell or battery is captured in the pocket formed by the fold-over operation, and the conductive pad 55 is in circuit with conductive trace means 51, while conductive pad 56 is in circuit with conductive trace means 52. Tang portions 56A and 56B are in contact to close the circuit. The operation and functional features of this configuration are similar to those of the structure of the embodiment of FIGS. 1–6 described hereinabove.

As will be appreciated, the elongated flexible substrate is preferably formed from a tear-resistant durable plastic substance. One highly suited material for the substrate is stress oriented polyethyleneterephthalate (PET) available under the trade designation "Mylar" from E. I. DuPont de Nemours Corp. of Wilmington, Del. Other durable substrates may be utilized as well, it being noted, however, that polyester materials such as PET provide a desirable substrate for receiving layers or films of adhesive and other coatings thereon using common film printing techniques.

The conductive traces are preferably created by forming a coating of electrically conductive carbon or silver-impregnated carbon (e.g. 60% silver/40% carbon or, more preferably, about 70% silver/30% carbon). Such coatings are commercially available.

A suitable power source 12 is a button type battery having an output of at least about 3 volts. Button batteries having outputs of up to 3.6 volts are also commercially available. These may be stacked in series to provide an output which is a multiple of 3 volts. Certain animals have a higher degree of sensitivity to the flow of electrical current, and accordingly voltage sources having an output of between 4 volts and 6 volts may be appropriately utilized.

It is particularly preferred that lower voltages, e.g. less than 9 volts and preferably no more than about 8 volts, be employed. Many prior art systems employ higher voltages. Such higher voltage systems typically deliver a more powerful electric jolt to the animal. Surprisingly, however, It has been found that a lower voltage source may provide an equally effective deterrent, and may well provide a more effective deterrent, without causing the animal as much pain. While the exact mechanism of this effect is not fully understood, it is believed that voltage levels below 9 volts fail to deliver a particularly painful shock, yet produce a long-lasting unpleasant taste in the animal's mouth that persists long after the animal removes its tongue from contact with the conductive traces of the deterrent apparatus 10. Many animals are conditioned to avoid touching the deterrent apparatus after coming into contact with the conductive traces just a few times.

FIGS. 9–12 illustrate a particularly preferred embodiment of an electrical animal deterrent apparatus 110 in accordance with the present invention. This embodiment is similar to both of the previous embodiments in that it is designed for use with a similar power source 12 and may be attached to an animal in much the same way to achieve much the same result. The primary difference between this embodiment and the embodiment of FIGS. 7 and 8, for example, lies in the design of the conductive traces and the use of a dielectric layer to enhance operation and use.

Figure 9:
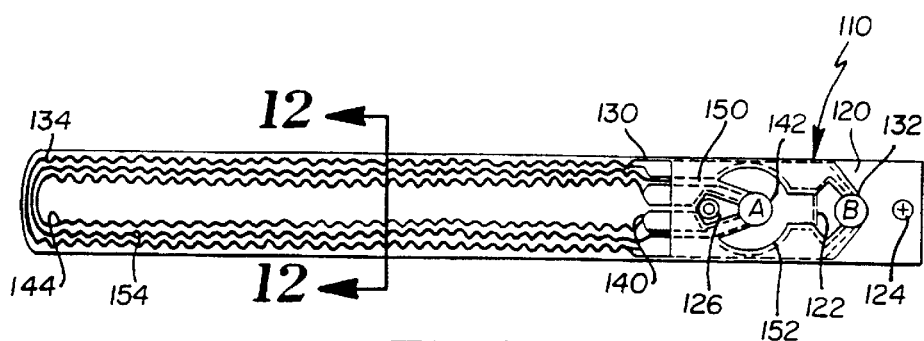
FIG. 9 is a top plan view schematically illustrating an animal deterrent apparatus in accordance with another embodiment of the present invention.
Figure 10:
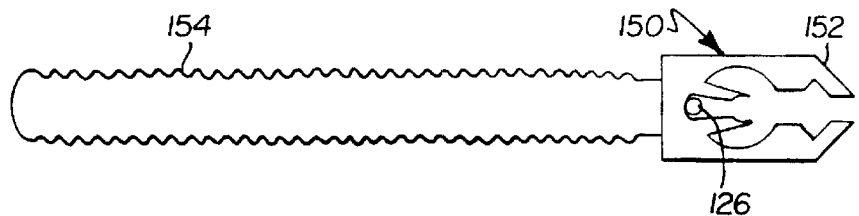
FIG. 10 is a top plan view of the dielectric layer used in the animal deterrent apparatus of FIG. 9.
Figure 11:
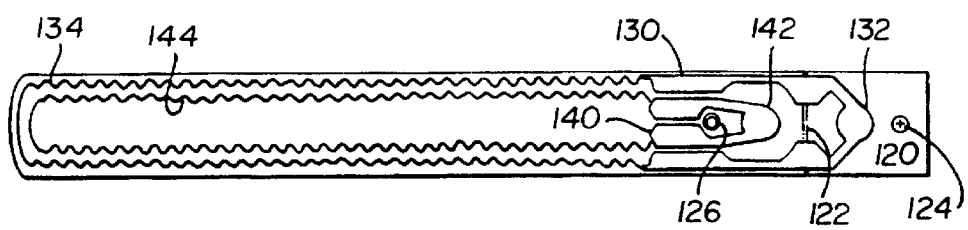
FIG. 11 is a top plan view of the substrate and conductive portions of the animal deterrent apparatus of FIG. 9 with the dielectric layer removed.

FIG. 9 schematically illustrates the deterrent apparatus 110 laid flat before it is folded over to enclose a battery or other power source (omitted from FIG. 9 for purposes of clarity). This apparatus 110 comprises an elongate substrate 120 with a pair of conductive traces 130 and 140 and a dielectric layer 150. FIG. 9 illustrates the complete apparatus 110 while FIGS. 10 and 11 provide separate views of the dielectric layer 150 and the rest of the apparatus, respectively.

The inner conductive trace 140 includes a contact pad 142 (bearing the designation "A") and an elongate, loop-shaped exposed pathway 144. The outer conductive trace 130 also includes a contact pad 132 (bearing the designation "B") and an elongate, loop-shaped exposed pathway 134. It should be noted that the conductive pathways 134 and 144 of these two traces 130, 140 are spaced apart from one another along their entire length to avoid an inadvertent short circuit. As mentioned above, these conductive traces can be made of any suitable material, such as a 70:30 mixture of silver and graphite.

The dielectric layer 150 has a base portion 152 and a strip portion 154. The base portion 152 overlays a portion of each of the inner and outer conductive traces. Desirably, the dielectric layer extends to a position immediately adjacent each of the contact pads 132 and 142, but these contact pads remain exposed. The strip portion 154 of the dielectric layer 150 is positioned between the spaced-apart lengths of the pathways 134 and 144 of the conductive traces. The dielectric layer should be formed of a dielectric material having sufficient dielectric potential to effectively isolate the conductive traces 130 and 140 from one another. While metal oxides and the like could be used, plastic dielectric materials (many of which are commercially available) are preferred as they tend to be easier to apply in a durable, flexible layer that can withstand the intended conditions of use of the deterrent apparatus 110. In a preferred embodiment, the conductive traces are laid down directly on a surface of the substrate 120 and the dielectric layer 150 is applied over the top of the conductive traces.

In use, the power source will be positioned to deliver power to the two contact pads 132 and 142. For example, a button type battery (or a stack of button type batteries in series) can be positioned with one terminal in electrical contact with the contact pad 142 of the inner conductive trace 140. If so desired, the battery can be attached thereto during shipping by means of an electrically conductive adhesive. The substrate 120 can then be folded along the indicated fold line 122 such that the contact pad 132 of the outer conductive trace 130 is in electrical contact with the opposite terminal of the battery. Optimally, the contact pad 132 is covered with an electrically conductive adhesive which will both electrically connect the pad to the battery and physically attach the substrate to the battery to hold the battery in place with respect to the substrate.

If so desired, the substrate may be provided with printed indicia which assist the user in properly folding the substrate to enclose the power source. In the embodiment of FIGS. 9–11, there are two markings 124 and 126. A first indicia 124 is positioned on the side of the inner contact pad 142 opposite the outer contact pad 132; a second indicia 126 is positioned on the side of the outer contact pad 132 opposite the inner contact pad 142. By aligning the first and second indicia with the battery or other power source attached to the inner contact pad 142, the user can be assured that the substrate will be properly positioned to electrically connect the battery to the outer contact pad 132 upon folding over the substrate. In one preferred embodiment, each of these indicia is printed from the same conductive material used to print the conductive traces 130 and 140 or the same dielectric material used to print the dielectric layer. While the indicia are not intended to form a part of the electrical circuit of the operating apparatus 110, use of these materials can simply the manufacturing process and ensure that the indicia are properly oriented with respect to the contact pads 132, 142.

The base 152 of the dielectric layer should extend over a sufficient surface area of the conductive traces 130, 140 to prevent the conductive traces from inadvertently contacting one another when the substrate is folded over to enclose the power supply. Such electrical contact between these two oppositely charged traces would short out the electrical circuit and drain the power source.

Figure 12:
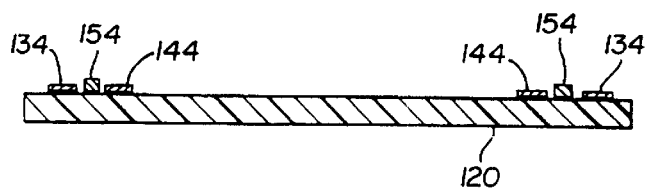
FIG. 12 is a side cross sectional view taken along line 12—12 of FIG. 9.

As best seen in the schematic illustration of FIG. 12, the strip portion 154 of the dielectric layer 150 is positioned between the spaced-apart lengths of the pathways 134 and 144 of the conductive traces. As noted above, the strip portion of the dielectric layer helps electrically isolate these conductive traces during ordinary use. In addition, it has been found that conductive traces printed using a silver/graphite mixture such as that mentioned above have a tendency to grow branch-like dendrites which bridge the space between the pathways 134 and 144 to short out the electrical circuit. As suggested by FIG. 12, the dielectric strip portion 154 also serves as something of a physical barrier between the two pathways 134, 144. This is believed to significantly impede the growth of dendritic bridges between the two pathways, helping preserve the electrical integrity of the device.

Figure 13:
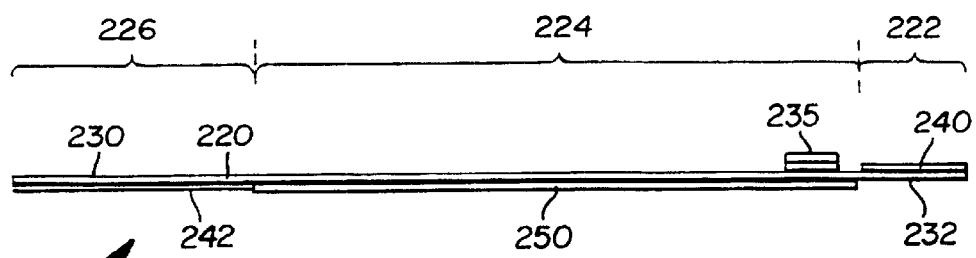
FIG. 13 is a side plan view of another embodiment of the invention employing a novel attachment mechanism.
Figure 14:
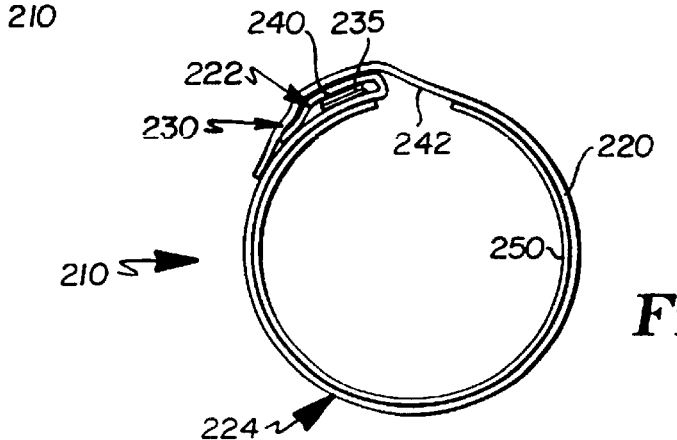
FIG. 14 is a side plan view of the animal deterrent apparatus of FIG. 13 schematically illustrating its configuration when attached to an animal's limb.

FIGS. 13 and 14 illustrate another embodiment of an animal deterrent device 210 in accordance with the invention. FIGS. 13 shows the device in a flat configuration prior to use while FIG. 14 illustrates the shape the device may take if it were wrapped around a pet's limb. The exact nature of the electrical circuit carried on the upper surface 230 of the device can be varied as desired; any of the embodiments discussed above in connection with FIGS. 1–12 would suffice. The primary significance of the embodiment of FIGS. 13 and 14 lies in the manner in which it is attached to the animal rather than the precise shape of the conductive traces or the presence or lack of a dielectric layer.

As discussed above, the animal deterrent apparatus 10 shown in FIGS. 1–6 can carry a pressure sensitive adhesive backing 27 to allow the user to simply adhere the apparatus to the animal's skin or fur. For many animals, this will work well. For some animals, however, it may be difficult to find a suitable adhesive which will withstand the rigors of actual use. For example, horses tend to sweat and that sweat may break down the adhesive, making it easier for the horse to dislodge the device. The embodiment of FIGS. 13 and 14 also employs an adhesive, but does not place that adhesive in direct contact with the animal's skin. Instead, the deterrent apparatus 210 of these drawings is held in place by means of friction and compressive forces.

As best seen in FIG. 13, the substrate 220 of this apparatus 210 has a proximal length 222, a distal length 226 and an intermediate length 224 extending between the proximal and distal lengths. The proximal length 222 may include an electrically conductive adhesive 240 carried on the upper surface 230 thereof. As noted above, such an electrically conductive adhesive 240 can be used to electrically and physically connect one of the conductive traces of the device to the power source, typified as a stacked pair of button type batteries 235. In the illustrated embodiment, the lower surface 232 of the proximal length 222 is free of adhesive. In another configuration, the lower surface 232 of the proximal length 222 may carry one layer of a multi-layer adhesive system, as discussed below.

The lower surface 232 of the intermediate length 224 of the substrate carries a backing 250. This backing 250 desirably increases the friction between the apparatus 210 and the animal's skin when in use. It is also desirably formed of a flexible, compressible material. For example, the backing 250 may comprise a polymeric foam (e.g. polyurethane or neoprene) attached to the lower surface 232 of the substrate and extending along the entire intermediate length 224 of the substrate.

The lower surface 232 of the distal length 226 of the substrate is provided with an adhesive 242 adapted to adhere well to at least the lower surface 232 of the proximal length 222 of the substrate. The purpose of this adhesive is best understood with reference to FIG. 14. When in use, the substrate 220 will be folded over to form a pocket to hold the batteries 235 in place. The rest of the substrate is then wrapped about the limb of the animal (omitted for purposes of simplicity) until the distal length 226 of the substrate wraps back over at least a portion of the proximal length 222. The adhesive 242 of the distal length 226 will hold the substrate in place about the limb. As noted above, the lower surface 232 of the proximal length 222 in the illustrated design is free of adhesive, but it may carry an adhesive. This adhesive can be designed to coact with the adhesive 242 of the distal length 226 to better secure the apparatus about the animal's limb.

Since the limbs on which the apparatus 210 is secured will not all have the same circumference, the extent to which the substrate 220 overlaps itself will vary from one application to the next. In many instances, the distal length 226 of the substrate may overlap the intermediate length 224, as illustrated. The upper surface 230 of the intermediate length 224 carries the conductive traces (not shown) which deliver the electrical shock to the animal's tongue. To prevent the adhesive from shorting out the electrical circuit of the apparatus, it is important that he adhesive 240 have minimal electrical conductivity. This is in contrast to the adhesive 240 carried on the upper surface 230 of the proximal length 222.

When the apparatus 210 of FIGS. 13 and 14 is installed on an animal's limb, it is desirably pulled fairly taut so it will act compressively about the animal's limb. If the backing 250 is formed of a resilient foam material as is preferred, the compressed foam will exert a fairly gentle but consistent force against the animal's limb. As a consequence, this backing will help hold the apparatus 210 in place about the animal's limb even if the animal perspires. The backing is also helpful in that it can permit the apparatus to shift somewhat without falling off the limb if the animal tries to dislodge the apparatus, e.g., by rubbing against a stationary object.

It will be appreciated that the examples given herein are for purposes of illustration only and are not to be regarded as limiting the scope and substance of the appended claims of this application.

What is claimed is:

1. Electrically actuated apparatus for discouraging animals from licking, comprising:
   (a) a laminate body having an inner surface and an outer surface, the outer surface having exposed conductive traces positioned therealong, the exposed conductive traces being spaced apart from one another, the laminate body comprising an elongated flexible substrate folded upon itself to define a pocket receptacle;
   (b) an electrical power source retained within the pocket receptacle in the folded substrate, the power source being electrically coupled to said exposed conductive traces;
   (c) an adhesive carried by the inner surface of the laminate to bond the laminate to the body of an animal with the conductive traces exposed adjacent a wound so that when the conductive traces contact the animal's tongue, the tongue completes an electrical circuit and an electrical impulse is delivered through the tongue; and
   (d) a dielectric material disposed between the conductive traces to electrically isolate the conductive traces from one another.

2. The apparatus of claim 1 wherein the electrical power source comprises at least one battery, the power source having an output potential of between about 3 volts and about 6 volts.

3. The apparatus of claim 1 wherein the electrical power source comprises at least one battery, adjacent conductive traces being electrically coupled to opposite poles of the battery.

4. The apparatus of claim 1 wherein the electrical power source is retained within the pocket receptacle by means of an electrically conductive adhesive, the adhesive further serving to electrically couple the power source to the conductive traces.

5. The apparatus of claim 1 wherein the substrate comprises first and second segments, the first segment being folded over the second segment to define the pocket receptacle, the first and second segments being attached to one another by an adhesive.

6. The apparatus of claim 5 wherein the substrate comprises first and second segments, the substrate in its flat, unfolded configuration having two opposite surfaces which run along both of the first and second segments, the outer surface of the laminate body comprising one surface of the substrate along the first segment and the opposite surface of the substrate along the second segment.

7. The apparatus of claim 1 wherein dielectric material is disposed between without covering the conductive traces along the portions of the length thereof, but the dielectric material overlies terminal length of each of the conductive traces.

8. The apparatus of claim 1 wherein the dielectric material is visible against the substrate, the dielectric material being configured on the substrate to define indicia thereon.

9. Electrically actuated apparatus for discouraging animals from licking, comprising:
   (a) an elongated flexible substrate having an inner surface and an outer surface and having a proximal length, a distal length and an intermediate length extending between the proximal and distal lengths, the outer surface having exposed conductive traces positioned along at least the intermediate length thereof, the distal length being foldable to define a pocket receptacle;
   (b) an adhesive carried by the inner surface of the substrate along one or both of the distal length thereof and the proximal length thereof, the adhesive being positioned to attach the inner surface of a portion of the distal length to a surface of the proximal length with the intermediate length extending about a limb of the animal with the inner surface of the intermediate length oriented inwardly toward said limb and the conductive traces being exposed so that when the conductive traces contact the animal's tongue, the tongue completes an electrical circuit and an electrical impulse is delivered through the tongue; and
   (c) an electrical power source carried by at least one of the intermediate length and the proximal length and being electrically coupled to the exposed conductive traces, the power source being retained within the pocket receptacle when the distal length is folded to define said receptacle.

10. The apparatus of claim 9 wherein the inner surface of the substrate carries a friction-enhancing backing along at least the intermediate length thereof.

11. The apparatus of claim 10 wherein the backing comprises an adhesive.

12. The apparatus of claim 10 wherein the backing is flexible and compressible.

13. The apparatus of claim 12 wherein the backing comprises a polymeric foam.

14. The apparatus of claim 9 wherein the exposed conductive traces are spaced from one another, further comprising a dielectric material disposed between the conductive traces to electrically isolate the conductive traces from one another.

15. Electrically actuated apparatus for discouraging animals from licking, comprising:

(a) an elongated flexible substrate having an inner surface and an outer surface, the outer surface having exposed, spaced-apart conductive traces positioned therealong and a dielectric material disposed between and tending to electrically isolate the conductive traces from one another, the substrate being folded upon itself to define a pocket receptacle;

(b) an electrical power source retained within the pocket receptacle in the folded substrate, the power source being electrically coupled to said exposed conductive traces;

(c) an adhesive carried by at least a portion of the inner surface of the laminate to facilitate attachment of the substrate to the body of an animal with the conductive traces exposed so that when the conductive traces contact the animal's tongue, the tongue completes an electrical circuit is completed and an electrical impulse is delivered through the tongue.

16. A method of deterring an animal from licking a wound, comprising:

(a) providing an electrical power source and an elongate, flexible substrate having first and second segments, conductive traces extending along each of the first and second segments;

(b) placing the electrical power source on a surface of the substrate adjacent a junction of the first and second segments and folding the first segment over the second segment to define a laminate body having an outer surface defined by a surface of the first segment and a surface of the second segment and an inner surface, folding the first segment over the second segment simultaneously capturing the electrical power source between the first and second segments and electrically connect the electrical power source to the conductive traces;

(c) attaching the resulting laminate body to the animal adjacent the wound such that the conductive traces of the first segment and the conductive traces of the second segment of the substrate are both exposed on the outer surface of the laminate body; and (d) delivering an electrical impulse of no more than about 6 volts to the animal's tongue to deter the animal from licking the wound.

* * * * *